United States Patent

[11] 3,617,361

| [72] | Inventors | Hans Reinhard<br>Limburgerhof;<br>Klaus Gulbins, Limburgerhof; Bernhard<br>Dotzauer, Maxdorf, all of Germany |
|---|---|---|
| [21] | Appl. No. | 5,947 |
| [22] | Filed | Jan. 26, 1970 |
| [45] | Patented | Nov. 2, 1971 |
| [73] | Assignee | Badische Anilin- & Soda-Fabrik<br>Aktiengesellschaft<br>Ludwigshafen am Rhine, Germany |
| [32] | Priority | Jan. 31, 1969 |
| [33] | | Germany |
| [31] | | P 19 04 743.9 |

[54] MANUFACTURE OF PRESSURE-SENSITIVE ADHESIVE ARTICLES
8 Claims, No Drawings

[52] U.S. Cl. ................................................117/122 PA,
117/161 UC, 117/161 K, 117/161 UT,
117/161 UN, 260/33.6 UA, 260/33.6 UB,
260/859, 260/901
[51] Int. Cl. ................................................ C09j 7/04
[50] Field of Search ................................ 117/122 P,
122 PA, 161 K; 260/33.6 UA, 33.6 UB, 901, 859

[56] References Cited
UNITED STATES PATENTS

| 3,542,741 | 11/1970 | Hartmann et al. | 117/132 X |
| 3,365,410 | 1/1968 | Wesslau et al. | 260/901 X |
| 3,257,478 | 6/1966 | Jubilee et al. | 260/901 |
| 3,066,043 | 11/1962 | Hechtman et al. | 260/901 X |
| 3,492,260 | 1/1970 | Samour et al. | 117/122 X |
| 3,222,419 | 12/1965 | Jubilee et al. | 260/901 X |

Primary Examiner—William D. Martin
Assistant Examiner—Bernard D. Pianalto
Attorney—Johnston, Root, O'Keeffe, Keil, Thompson & Shurtleff ABSTRACT: Manufacture of pressure-sensitive adhesive coatings on flat substrates by coating the substrates with dispersions of copolymers (A) comprising 30 to 99.5 percent by weight of acrylic and/or methacrylic acid esters of $C_1$ to $C_3$ alkanols, 0.5 to 20 percent by weight of monoesters of $C_3$ to $C_5$ $\alpha,\beta$-olefinically unsaturated mono- or dicarboxylic acids and $C_2$ to $C_6$ polyhydric alcohols and/or N-alkoxy-methyl amides of $C_3$ to $C_5$ $\alpha,\beta$-olefinically unsaturated carboxylic acids, 0 to 50 percent by weight of vinyl esters of $C_2$ to $C_{18}$ monocarboxylic acids, styrene, acrylonitrile and/or methycrylonitrile and 0 to 15 percent by weight of $\alpha,\beta$-olefinically unsaturated $C_3$ to $C_5$ carboxylic acids and/or their amides, in liquid hydrocarbons containing, as protective colloids, 25 to 150 percent by weight of the dispersed copolymer (A) of a dissolved copolymer (B) comprising 80 to 99.5 percent by weight of acrylic and/or methacrylic acid esters of $C_4$ to $C_{18}$ alkanols and 0.5 to 20 percent by weight of monoesters of $C_3$ to $C_5$ $\alpha,\beta$-olefinically unsaturated mono- or dicarboxylic acids and $C_2$ to $C_6$ polyhydric alcohols and/or N-alkoxy-methyl amides of $C_3$ to $C_5$ $\alpha,\beta$-olefinically unsaturated carboxylic acids, and also optionally up to two molar proportions of a polyvalent isocyanate, based on the sum of the proportions of free hydroxyl and carboxyl groups in the copolymers (A) and (B), and drying the coated substrates.

MANUFACTURE OF PRESSURE-SENSITIVE ADHESIVE ARTICLES

This invention relates to a process for the manufacture of pressure-sensitive adhesive articles by coating flat substrates with cross-linkable polymers of acrylic or methacrylic acid esters.

It is well known that pressure-sensitive adhesive articles such as adhesive tapes, adhesive sheeting or self-adhesive floor tiles of, for example, polyvinyl chloride or needleloom floor-covering material may be made by coating them on one of their surfaces, for example by means of brush or doctor knife application, with solutions of cross-linkable polymers of predominantly acrylic or methacrylic acid esters of lower alkanols, such as n-butyl acrylate, and minor quantities of monomers containing cross-linkable groups, such as N-methylolacrylamide or glycol monoacrylate, and then drying the coated substrates, usually at elevated temperatures. The solvent used in the polymer solutions is generally ethyl acetate and/or methylethyl ketone or a mixture of these solvents with toluene. Such known processes generally suffer from the disadvantage that the polymer solutions are highly viscous even at relatively low polymer concentrates, which frequently makes their manipulation uneconomical. In addition, when sheeting of polyvinyl chloride or cellulose acetate, for example, is coated in the known processes, the solvents used cause swelling or partial dissolution of the substrate, which is injurious thereto.

It is also known to manufacture pressure-sensitive adhesive articles by coating flat substrates with aqueous dispersions of copolymers of predominantly acrylic esters of lower alkanols with minor quantities of cross-linking monomers, such as N-methylolamides of $\alpha,\beta$-olefinically unsaturated $C_3$ to $C_5$ carboxylic acids, and then drying the coated substrates. In some cases, however, for example in the case of pressure-sensitive adhesive tape for electrical insulating purposes, the electrolytes and water-soluble protective colloids contained in the aqueous dispersions constitute a drawback.

Moreover, the so-called score resistance of laminates incorporating glossy sheeting is unsatisfactory where conventional nonaqueous polyacrylate adhesives are used for their production.

We have now found that in the manufacture of pressure-sensitive coatings on flat substrates by coating the flat substrates with cross-linkable polymers of acrylic and/or methacrylic acid esters of lower alkanols with minor quantities of monomers containing cross-linkable groups in solution or dispersion and drying the coated substrates it is advantageous to use, for coating, dispersions of copolymers (A) comprising 30 to 99.5 percent by weight of esters of $C_1$ to $C_3$ alkanols with $C_3$ to $C_4$ $\alpha\beta$-olefinically unsaturated monocarboxylic acids, 0.5 to 20 percent by weight of monoesters of $C_3$ to $C_5$ $\alpha,\beta$-olefinically unsaturated mono- or dicarboxylic acids with $C_2$ to $C_6$ polyhydric alcohols and/or N-alkoxymethyl amides of $C_3$ to $C_5$ $\alpha,\beta$-olefinically unsaturated carboxylic acids, 0 to 50 percent by weight of vinyl esters of $C_2$ to $C_{18}$ monocarboxylic acids, styrene, acrylonitrile and/or methacrylonitrile, and 0 to 15 percent by weight of $\alpha,\beta$-olefinically unsaturated $C_3$ to $C_5$ carboxylic acids and/or their amides and/or vinyl pyrrolidone in hydrocarbons containing, as protective colloids, 25 to 150 percent by weight of the dispersed copolymer (A) of a dissolved copolymer (B) comprising 80 to 99.5 percent by weight of esters of $C_4$ to $C_{18}$ alkanols with $C_3$ to $C_4$ $\alpha,\beta$-olefinically unsaturated monocarboxylic acids, 0.5 to 20 percent by weight of monoesters of $C_3$ to $C_5$ $\alpha,\beta$-olefinically unsaturated mono- or dicarboxylic acids with $C_2$ to $C_6$ polyhydric alcohols and/or N-alkoxymethyl amides of $C_3$ to $C_5$ $\alpha,\beta$-olefinically unsaturated carboxylic acids, and also optionally up to two molar proportions of polyvalent isocyanates, based on the sum of the proportions of free hydroxyl and carboxyl groups in the copolymers (A) and (B).

The dispersions of cross-linkable polyacrylic or polymethacrylic esters (A) used in our new process may be made, for example, by known techniques as described for example in the German published application DAS No. 1,201,064 utilizing the cross-linking monomers such as the N-alkoxymethyl amides of $C_3$ to $C_5$ $\alpha,\beta$-olefinically unsaturated carboxylic acids or monoesters of acrylic acid with $C_2$ to $C_6$ polyhydric alkanols, when the protective colloids used are dissolved copolymers (B) which may also be obtained by known methods and which comprise acrylic and/or methacrylic acid esters of $C_4$ to $C_{18}$ alkanols and 0.5 to 20 percent by weight of cross-linking monomers of the kind stated. The new dispersions used in the process of the invention in general contain 10 to 65 percent of undissolved, dispersed cross-linkable polymer and preferably 30 to 55 percent by weight based on the total dispersion. The diameter of the disperse polymer particles is mostly less than 1 $\mu$. The viscosity of the dispersion varies only slightly with temperature and its value, at room temperature, is usually between 5 and 15 poises when the total concentration of copolymers (A) and (B) is about 50 percent by weight.

The disperse copolymers (A) contained in the dispersions preferably contain 40 to 70 percent by weight of polymerized units of acrylic and/or methacrylic acid esters of $C_1$ to $C_3$ alkanols. We prefer to use copolymers of methyl, ethyl, n-propyl and iso-propyl acrylate. Other suitable copolymers are those of methyl, ethyl, n-propyl and iso-propyl methacrylate, but the proportion of methyl acrylate in the copolymer (A) should in general not exceed 50 percent. The dispersed copolymers (A) should have their glass temperatures preferably below 20° C. and more preferably below 0° C. Their K values (as measured after Fikentscher, "Cellulosechemie," 13, 58 (1932) are usually between 10 and 120 and preferably between 30 and 80.

The cross-linking comonomers contained as polymerized units in the copolymers (A) are, for example, monoesters of $C_3$ to $C_5$ $\alpha,\beta$-olefinically unsaturated mono- or dicarboxylic acids, such as acrylic acid, methacrylic acid, maleic acid, fumaric acid and itaconic acid, with $C_2$ to $C_6$ polyhydric alcohols. Suitable polyhydric alcohols are above all $C_2$ to $C_6$ alkane diols, such as ethylene glycol, 1,2-propylene glycol, 1,4-butane diol and 1,6-hexane diol, and cyclohexane diols such as 1,4-cyclohexane diol. Glycerol and pentaerythritol are also suitable. The monoesters are preferably derived from monocarboxylic acids, particularly acrylic acid. As suitable monoesters there may be mentioned, for example, glycol monoacrylate, 1,4-butane diol monoacrylate, 1,4-butane diol methacrylate, 1,6-hexane diol monoacrylate, 1,4-cyclohexane diol monoacrylate, glycol monomaleate, 3-chloro-2-hydroxypropyl acrylate, 3-chloro-2-hydroxypropyl methacrylate and glycol monofumarate. Other suitable cross-linking comonomers are N-alkoxymethyl amides of $C_3$ to $C_5$ $\alpha,\beta$-olefinically unsaturated carboxylic acids, such as maleic acid and crotonic acid and, in particular, acrylic and methacrylic acids, the alkoxy group generally containing one to eight and preferably one to four carbon atoms. Examples of particularly suitable N-alkoxymethyl amides of $\alpha,\beta$-olefinically unsaturated mono- and dicarboxylic acids are N-methoxymethyl acrylamide, N-methoxymethyl methacrylamide, N-ethoxymethyl acrylamide and methacrylamide, N-n-butoxymethyl acrylamide and methacrylamide and N-methoxymethyl maleic acid amide and N-n-butoxymethyl maleic acid imide.

The dispersed copolymers (A) may also contain up to 50 percent by weight of vinyl esters of $C_2$ to $C_{12}$, preferably $C_2$ to $C_8$ and particularly $C_2$ or $C_3$ monocarboxylic acids, for example vinyl acetate, vinyl propionate, vinyl n-butyrate, vinyl laurate and vinyl stearate, and also styrene, acrylonitrile and/or methacrylonitrile, and conveniently up to 10 percent by weight of $\alpha\beta$-olefinically unsaturated $C_3$ to $C_5$ carboxylic acids such as, in particular, acrylic and methacrylic acids, and also crotonic, maleic, fumaric and/or itaconic acids and/or their amides such as acrylamide and methacrylamide, and also vinyl pyrrolidone, as polymerized units thereof. Particularly interesting are those copolymers (A) which contain 15 to 35 percent by weight of styrene and/or acrylonitrile as polymerized units thereof, particularly when they also contain 0.5 to 5 percent by weight of polymerized units of acrylic acid and/or methacrylic acid and/or arcylamide and/or methacrylamide and/or N-vinyl pyrrolidone. Of great interest are also those copolymers (A) which contain, in addition to the acrylic or methacrylic acid esters and the cross-linking monomers, polymerized units of only acrylic or methacrylic acid, that is, of $\alpha,\beta$-olefinically unsaturated monocarboxylic acids of three or four carbon atoms, their concentration being preferably in the range of 1 to 5 percent by weight. In this case the concentration of polymerized units of acrylic and/or methacrylic acid esters is 75 to 98.5 percent, preferably 85 to 98.5 percent by weight of the copolymer (A).

The copolymers (B) contained in the dispersions as protective colloids should contain 80 to 99.5 percent by weight of polymerized units of acrylic and/or methacrylic acid esters, that is, of esters of $C_3$ to $C_4$ $\alpha,\beta$-olefinically unsaturated monocarboxylic acids with $C_4$ to $C_{18}$, preferably $C_4$ to $C_{12}$ and particularly $C_4$ to $C_8$ straight-chain or branched-chain alkanols. They may be derived, for example, from n-butyl acrylate, n-butyl methacrylate, n-hexyl-acrylate, 2-ethylhexyl acrylate, 2-ethylhexyl methacrylate, n-dodecyl acrylate or stearyl acrylate and preferably contain 60 to 90 percent by weight of polymerized units of such acrylic or methacrylic acid esters. The cross-linking comonomers contained therein may consist of polymerized units of the same monoesters of alkane diols and/or N-alkoxymethyl amides as those given above for the copolymers (A), the same monoesters and N-alkoxymethyl amides being preferred. Copolymers (A) and (B) may if desired contain the same cross-linking comonomers. The K value of the copolymers (B) are generally in the range of 10 to 70, preferably 20 to 50.

The continuous phase of the dispersions used in our new process is a liquid hydrocarbon, suitable hydrocarbons being liquid saturated hydrocarbons having a boiling point (under normal pressure) generally between 45 and 200° C. and preferably between 65 and 130° C. Particularly suitable hydrocarbons are ligroin, cyclohexane and liquid aromatic hydrocarbons such as benzene, toluene and xylene. Mixtures of liquid aliphatic and aromatic hydrocarbons, particularly mixtures of gasoline and toluene, are also suitable.

The dispersions used in our new process may also contain up to two molar proportions, preferably 0.1 to one molar proportion (based on the sum of the proportions of free hydroxyl and/or carboxyl groups in the copolymers (A) and (B) of a polyvalent isocyanate, in particular of di- and triisocyanates, that is, isocyanates containing two or three, e.g. two to three isocyanate groups. Suitable isocyanates are, for example, 2,4-toluylene diisocyanate, 2,6-toluylene diisocyanate, 4,4'-diphenylmethane diisocyanate, naphthylene-1,5-diisocyanate, triphenyl-methane-4,4',4''-triisocyanate and hexamethylene-1,6-diisocyanate. Also suitable are polyvalent isocyanates of higher molecular weights ranging, in general, up to about 800.

Such polyvalent isocyanates may be advantageously used in the process of the invention when the copolymers (A) and/or (B) contain, as cross-linking comonomers, polymerized units of monoesters of $C_3$ to $C_5$ $\alpha\beta$-olefinically unsaturated mono- or dicarboxylic acids with saturated polyhydric alcohols and/or $\alpha,\beta$-olefinically unsaturated monocarboxylic acids. They may be added to the dispersions in the form of solutions or dispersions in, for example, liquid hydrocarbons or esters or ketones such as ethyl acetate or acetone, the proportion of ester or ketone being in general below 20 percent by weight of the amount of liquid hydrocarbon used to avoid dissolution of the dispersed polymers. Such mixtures are surprisingly stable and may be stored for many weeks before use. Where polyvalent isocyanates are added it is sometimes advantageous also to add a usual accelerator for the reaction of isocyanates with alcoholic groups, for example an amine such as triethylene diamine, in quantities ranging, in general, from 0.025 to 0.25 percent and preferably from 0.05 to 0.1 percent by weight of the solids content of the new dispersion.

In our process the dispersions may be applied in the usual manner, for example by knife-coating, roller-coating, brushing or spraying, the rate of application usually being in the range of 5 to 75 g./m.², preferably 15 to 30 g./m.² (in terms of weight of solids per square meter of substrate). The coated substrates are then dried in the usual manner, generally at elevated temperatures preferably ranging from 50 to 150° C. In some cases, particularly where the copolymers (A) and/or (B) contain polymerized units of N-alkoxymethyl amides as cross-linking comonomer, it is advantageous to follow drying by tempering at temperatures ranging from 90 to 150° C. for a short period of, say, 2 to 15 minutes, in order to increase the degree of cross-linking in the polymers and thus raise the thermal stability of the bonds under load.

The process of the invention is suitable for the manufacture of, for example, pressure-sensitive adhesive articles such as pressure-sensitive adhesive tapes and like sheeting materials and self-adhesive floor tiles. Adhesive sheeting made according to the process of the invention and based on sheeting of cellulose acetate or polyolefins such as polypropylene is particularly suitable for lamination to paper or cardboard to provide a glossy surface, since such laminations show particularly high score resistance.

In the following examples data are given on the score resistance, tack bond strength and thermal stability of bonds. The figures given were determined as follows:

a. Score resistance:

Sheets of cellulose acetate or polypropylene having a thickness of about 15 to 20 $\mu$ evenly knife-coated with the adhesive dispersion, and the coated sheets are dried at 90° C. during 5 minutes, In all cases the rate of application is 11 to 13 g. of polymer per square meter. After cooling to room temperature the resulting pressure-sensitive adhesive sheets are stuck to cards measuring 20×20 cm. and having a thickness of 400 $\mu$, the cards bearing black printing and the resulting laminates being substantially free of trapped bubbles. The laminates are then pressed for 2.5 to 5 minutes at 50° C. using a pressure of about 5 to 10 atmospheres gauge. The laminates are allowed to cool and fluting is applied parallel to each edge such that two groves and two ridges are provided in each case, this being effected by means of a perforating machine of type HF2/68 (made by E. Bickel, Maschinen- & Apparatebau KG, Heilbronn) and a fluting bar No. 03145. The score resistance is determined as follows: the above laminates serving as test samples are stored at 20° C. and 65 percent relative humidity and inspected visually each day. Where the bond is of unsatisfactory quality, the sheeting comes away from the card along the grooves, as may be seen from the cloudy appearance of the otherwise glossy laminate.

b. Surface tack:

Adhesive tapes measuring approximately 25 cm. in length and 2 cm. in width are clamped in the upper jaws of a tensile testing machine so as to form a loop or sling hanging vertically downwardly with its adhesive coating on the outside. The loop is then brought into contact with a horizontally fixed highly polished steel bay at the rate of 150 mm./minute and without the application of pressure. After the tape has been applied to the bar it is immediately pulled away from it at the same rate. The maximum force required to remove the loop from the bar is measured and noted.

The value given is the mean of ten results, a new tape being used for each test, between which the steel bar is washed with ligroin.

c. Bond strength:

An adhesive tape measuring approximately 25 cm. in length and 2 cm. in width is placed on a highly polished chromium-plated steel bar such that no trapped air bubbles occur and is then rolled into close contact with the bar ten times by means of a rubber-coated steel roller weighing 1 kg. After storing for 24 hours in an air-conditioned chamber at 20° C. the adhesive tape is pulled from the bar at an angle of 180° and at a speed of 150 mm./minute. The test distance is 10 to 12 cm. of the bonded tape. The force required to remove the tape is measured. The values given are means taken from 10 test results.

d. Thermal stability under load:

An adhesive tape of 2 cm. in width is stuck to a stainless steel bar over an area of 5 square centimeters such that no trapped air bubbles occur. The assembly is suspended in a drying cabinet and the free end of the tape is secured to a 500 g. weight. The assembly is heated in 30 minute stages at 50°, 60°, 70° C. and so on until the tape parts from the steel bar. The time and temperature required are a measure of the thermal stability of the bond. The values given are means taken from five test results.

In the following examples the parts and percentages are by weight.

EXAMPLE 1

100 parts of a 50 percent solids dispersion of a copolymer of 96 parts of ethyl acrylate and 4 parts of 3-chloro-2-hydroxypropyl acrylate in ligroin (b.p. 60 to 95° C.) containing, as protective colloid, 10 parts of copolymer of 97 parts of isooctyl acrylate and 3 parts of 3-chloro-2hydroxypropyl acrylate, per 15 parts of the ethyl acrylate copolymer (viscosity of dispersion = 4 poises at 25° C.) are gradually mixed with 3.5 parts of a 75 percent solution in ethyl acetate of a reaction product of 2,4- and 2,6-toluylene diisocyanate with a polyhydric alcohol having a molecular weight of approximately 650, an isocyanate group concentration of 13 percent and on average 3 isocyanate groups per molecule. The mixture is coated on to a polyester film having a thickness of 40 $\mu$, at the rate of 26 g./m.$^2$ (measured after drying at 90° C.).

The film is cut into tapes, and the resulting adhesive tapes have a surface tack of 0.5 kg./2 cm. and a bond strength of 0.6 kg./2 cm. When tested for thermal stability under load, the bond showed no parting at 150° C. during 24 hours. Observation of the score resistance revealed no change over a period of 4 months. The laminate shows excellent strength properties.

COMPARATIVE TEST

Example 1 is repeated except that the polyester film is coated with a 40 percent solution in ethyl acetate of a copolymer of equal parts of n-butyl acrylate and vinyl acetate, having a viscosity of 200 poises at 25° C. The resulting adhesive tapes have a tack of 0.2 kg./2 cm. and a bond strength of 0.1 kg./2 cm. On measuring the thermal stability under load the tapes parted from the bar after only 14 minutes at 150° C.

Laminations carried out between glossy films and paper or cardboard using this solution show excellent strength properties with the exception of score resistance where the film comes away from the substrate along the grooves after only 4 days.

EXAMPLE 2

Example 1 is repeated except that an adhesive mixture is used consisting of 100 parts of a 55 percent solids dispersion (viscosity 7 poises at 25° C.) of a copolymer of 85 parts of ethyl acrylate, 10 parts of methyl methacrylate and 5 parts of 3-chloro-2-hydroxypropyl acrylate in ligroin (b.p.60 to 95° C.) containing, as protective colloid, a copolymer of 92 parts of 2-ethylhexyl acrylate and 8 parts of 3-chloro-2-hydroxypropyl acrylate (one part of protective colloid per 4 parts of dispersed copolymer), and 4.5 parts of the 75 percent solution of the polyvalent isocyanate mentioned in example 1.

The resulting adhesive tapes have a surface tack of 0.4 kg./2 cm. and a bond strength of 1.0 kg./2 cm. On measuring the thermal stability under load the bond showed no signs of parting after 24 hours at 150° C. The groove stability of laminates incorporating such adhesive film is excellent, the grooves remaining unchanged after 4 months.

EXAMPLE 3

Example 2 is repeated except that the ligroin dispersion is replaced by a 55 percent solids dispersion (viscosity 8 poises at 25° C.) of a copolymer of 70 parts of ethyl acrylate, 10 parts of t-butyl acrylate, 10 parts of styrene, 5 parts of 3-chloro-2-hydroxypropyl acrylate and 5 parts of N-vinyl pyrrolidone in n-heptane containing, as protective colloid, 1 part of a 95:5 copolymer of 2-ethylhexyl acrylate/3-chloro-2-hydroxypropyl acrylate per 2 parts of said copolymer.

There are thus obtained, under otherwise similar conditions, adhesive tapes having a surface tack of 0.4 kg./2 cm. and a bond strength of 0.8 kg./2 cm. On measuring the thermal stability under load, the tapes did not part from the substrate during 24 hours at 150° C. Observation of the score resistance of laminates made with the above adhesive mixture showed no signs of change after 4 months and the glossy laminates showed excellent strength properties.

EXAMPLE 4

Example 1 is repeated, except that an adhesive mixture is used which consists of a 52 percent solids dispersion (viscosity 6 poises at 25° C.) of a copolymer of 90 parts of ethyl acrylate, 5 parts of 3-chloro-2-hydroxypropyl acrylate and 5 parts of 1,4-butane diol monoacrylate in ligroin (b.p. 60 to 95° C.) containing per part of copolymer 1 part of a protective colloid consisting of a copolymer of 85 parts of 2-ethylhexyl acrylate, 5 parts of acrylic acid, 5 parts of 3-chloro-2-hydroxypropyl acrylate and 5 parts of N-vinyl pyrrolidone.

There are thus obtained, under otherwise similar conditions, adhesive tapes having a surface tack of 0.6 kg./2 cm. and a bond strength of 0.7 kg./2 cm. On measuring the thermal stability under load, the bonds showed no signs of parting during 24 hours.

The score resistance of glossy laminates made with the above adhesive is excellent, and no change can be observed along the grooves during 4 months. The strength properties of the laminates are also excellent.

EXAMPLE 5

Example 1 is repeated except that the polyester film is coated with a 46 percent solids dispersion (Viscosity 13 poises at 25° C.) of a copolymer of 45 parts of iso-propyl acrylate, 25 parts of methyl methacrylate, 12 parts of vinyl propionate, 10 parts of vinyl laurate and 8 parts of 1,4-butane diol monoacrylate in ligroin (b.p. 60 to 95° C.) containing per 3 parts of said dispersed copolymer 1 part of a protective colloid consisting of a copolymer of 40 parts of 2-ethylhexyl acrylate, 48 parts of n-butyl acrylate and 12 parts of N-methoxymethacrylamide. The solvent is removed from the coated film by evaporation and the adhesive layer is then tempered for 3 minutes at 110° C. There is thus obtained an adhesive tape having a surface tack of 0.7 kg./2 cm. and a bond strength of 0.9 kg./2 cm. On measuring the thermal stability under load, no parting occurs on storing at 150° C. Score resistance observations revealed no change in glossy laminates made with the adhesive film during 4 months.

EXAMPLE 6

Example 1 is repeated except that the adhesive mixture used is a 53 percent solids dispersion (viscosity 15 poises at 25° C.) of a copolymer of 30 parts of vinyl acetate, 65 parts of propyl acrylate and 5 parts of methacrylamide in ligroin (b.p. 60 to 95° C.) containing, as protective colloid, 1 part per 2 parts of said dispersed copolymer of a copolymer of 40 parts of n-octyl acrylate, 50 parts of n-hexyl acrylate and 10 parts of N-$\beta$-hydroxyethylacrylamide. After removal of the solvent by evaporation the adhesive layer is tempered at 95° C. for 5 minutes. There is thus obtained a pressure-sensitive adhesive tape having a surface tack of 0.9 kg./2 cm. and a bond strength of 0.8 kg./2 cm. Observations of the thermal stability under load showed no parting of the bond on storing at 150° C. Tests on the score resistance of glossy laminates made with the above adhesive film reveal no change during 4 months.

EXAMPLE 7

Example 1 is repeated except that the adhesive mixture used is a 42 percent solids dispersion (viscosity 6 poises at 25°

C.) of a copolymer of 25 parts of vinyl acetate, 70 parts of isopropyl acrylate and 5 parts of methacrylic acid in ligroin (b.p. 60 to 95° C.) containing per 2 parts of said dispersed copolymer 1 part of a protective colloid consisting of a copolymer of 20 parts of n-nonyl acrylate, 50 parts of 2-ethylhexyl methacrylate, 20 parts of n-decyl acrylate and 10 parts of N-n-butoxymethacrylamide. After removal of the solvent by evaporation the adhesive coating is tempered at 140° C. for 3 minutes. There is thus obtained an adhesive tape having a surface tack of 0.4 kg./2 cm. and a bond strength of 11 kg./2 cm. Observations of the thermal stability under load showed no parting of the bond on storing at 150° C. Tests on the score resistance of glossy laminates reveal no change during 4 months.

EXAMPLE 8

Example 1 is repeated except that the adhesive mixture used is a 35 percent solids dispersion (viscosity 12 poises at 25° C.) of a copolymer of 80 parts of isopropyl acrylate, 10 parts of methyl acrylate and 10 parts of acrylamide in ligroin (b.p. 60 to 95° C.) containing per part of said dispersed copolymer 1 part of a protective colloid consisting of a copolymer of 90 parts of n-decyl methacrylate and 10 parts of N-ethoxycrotonic acid amide. After removal of solvent by evaporation the adhesive coating is tempered at 145° C. for 3 minutes. There is thus obtained an adhesive tape having a surface tack of 0.5 kg./2 cm. and a bond strength of 0.5 kg./2 cm. Observation of the thermal stability under load showed no parting of the bond on storing at 150° C. Tests on the score resistance of glossy film laminates made using the above adhesive tape revealed no change during 4 months.

EXAMPLE 9

Example 1 is repeated except that the adhesive mixture used is a 38 percent solids dispersion (viscosity 11.5 poises at 25° C.) of a copolymer of 30 parts methyl acrylate, 60 parts of ethyl acrylate and 10 parts of itaconic acid in petroleum (b.p. 60 to 95° C.) containing, as protective colloid, a copolymer of 86 parts of n-dodecyl methacrylate, 12 parts of N-n-butoxymethacrylamide and 2 parts of 3-chloro-2-hydroxypropyl acrylate, the ratio of dispersed copolymer to protective colloid copolymer in the dispersion being 4:5. After the removal of solvent by evaporation the adhesive coating is tempered at 135° C. for 3 minutes. There is thus obtained an adhesive tape having a surface tack of 0.6 kg./2 cm. and a bond strength of 0.8 kg./2 cm. Observations of the thermal stability under load showed no parting of the bond on storing at 150° C. Tests on the score resistance of glossy laminates made with the above film revealed no change during 4 months.

EXAMPLE 10

Example 1 is repeated except that the adhesive mixture used is a 41 percent solids dispersion (viscosity 8 poises at 25° C.) of a copolymer of 75 parts of n-propyl acrylate, 20 parts of acrylonitrile and 5 parts of 1,6-hexane diol monomethacrylate in ligroin (b.p. 60 to 95° C.) containing, as protective colloid, a copolymer of 40 parts of n-hexyl acrylate, 40 parts of n-decyl acrylate, 13 parts of n-octadecyl methacrylate, 5 parts of 3-chloro-2-hydroxypropyl acrylate and 2 parts of N-n-butoxy methacrylate, the ratio of dispersed copolymer to protective colloid copolymer in the dispersion being 2:3. After removal of the solvent by evaporation the adhesive coating is tempered at 90° C. for 3 minutes. There is thus obtained an adhesive tape having a surface tack of 0.4 kg./2 cm. and a bond strength of 0.9 kg./2 cm. Observations of the thermal stability under load show no parting of the bond on storing at 150° C. Tests on the score resistance of glossy laminates made with the above adhesive tape reveal no change during 4 months.

We claim:

1. In a process for the manufacture of pressure-sensitive adhesive coatings on flat substrates by coating said substrates with cross-linkable polymers of at least one of acrylic or methacrylic acid esters of lower alkanols with minor quantities of monomers containing cross-linkable groups in solution or dispersion and drying the coated substrate, the improvement comprising using dispersions of copolymers (A) consisting of 30 to 99.5 percent by weight of esters of $C_1$ to $C_3$ alkanols with $C_3$ to $C_4$ $\alpha,\beta$-olefinically unsaturated monocarboxylic acids, 0.5 to 20 percent by weight of monomers selected from the group consisting of (a) monoesters of $C_3$ to $C_5$ $\alpha,\beta$-olefinically unsaturated mono- and dicarboxylic acids with $C_2$ to $C_6$ polyhydric alcohols and (b) N-alkoxymethylamides of $C_3$ to $C_5$ $\alpha,\beta$-olefinically unsaturated carboxylic acids, 0 to 50 percent by weight of monomers selected from the group consisting of vinyl esters of $C_2$ to $C_{18}$ monocarboxylic acids, styrene, acrylonitrile or methacrylonitrile, and 0 to 15 percent by weight of monomers selected from the group consisting of $C_3$ to $C_5$ $\alpha,\beta$-olefinically unsaturated carboxylic acids, their amides and N-vinyl pyrrolidone in liquid hydrocarbons, said dispersions containing, as protective colloids, 25 to 150 percent by weight based on the weight of the dispersed copolymer (A) of a dissolved copolymer (B) consisting of 80 to 99.5 parts of esters of $C_4$ to $C_{18}$ alkanols with $C_3$ or $C_4$ $\alpha,\beta$-olefinically unsaturated monocarboxylic acids, and 0.5 to 20 percent by weight of monomers selected from the group consisting of monoesters of (a) $C_3$ to $C_5$ $\alpha,\beta$-olefinically unsaturated mono- and dicarboxylic acids with $C_2$ to $C_6$ polyhydric alcohols and (b) N-alkoxymethylamides of $C_3$ to $C_5$ $\alpha,\beta$-olefinically unsaturated carboxylic acids.

2. A process as claimed in claim 1 wherein said dispersions additionally contain up to 2 molar proportions based on the sum of the proportions of free hydroxyl and carboxyl groups in the copolymers (A) and (B) of a polyvalent isocyanate.

3. A process as claimed in claim 2 wherein the said dispersions additionally contain 0.1 to 1 molar proportion based on the sum of the proportions of free hydroxyl and carboxyl groups in the said copolymers (A) and (B) of a polyvalent isocyanate having a molecular weight of up to about 800.

4. A process as claimed in claim 2 wherein the said dispersions additionally contain 0.1 to 1 molar proportion based on the sum of the proportions of free hydroxyl and carboxyl groups in the said copolymers (A) and (B) of a polyvalent isocyanate having 2 to 3 isocyanate groups and a molecular weight of up to about 800.

5. A process as claimed in claim 2 wherein the said dispersions additionally contain 0.1 to 1 molar proportion based on the sum of the proportions of free hydroxyl and carboxyl groups in the said copolymers (A) and (B) of a polyvalent isocyanate selected from the group consisting of 2,4-toluylene diisocyanate 2,6-toluylene diisocyanate, 4,4'-diphenylmethane diisocyanate, naphthylene-1,5-diisocyanate, triphenylmethane-4,4', 4''-triisocyanate and hexamethylene-1,6-diisocyanate.

6. In a process for the manufacture of pressure-sensitive adhesive coatings on flat substrates by coating said flat substrates with cross-linkable polymers of at least one of acrylic or methacrylic acid esters of lower alkanols with minor amounts of monomers containing cross-linkable groups in solution or dispersion and drying the coated substrates, the improvement comprising using dispersions of copolymers (A) having a K value of 30 to 80 and consisting of 40 to 70 percent by weight of esters of $C_1$ to $C_3$ alkanols with $C_3$ to $C_4$ $\alpha,\beta$-olefinically unsaturated monocarboxylic acids, 0.5 to 20 percent by weight of monomers selected from the group consisting of a. monoesters of $C_3$ to $C_5$ $\alpha,\beta$-olefinically unsaturated monocarboxylic acids with $C_2$ to $C_6$ alkane diols and b. N-alkoxymethylamides of $C_3$ to $C_5$ $\alpha,\beta$-olefinically unsaturated carboxylic acids in which the alkoxy groups contain 1 to 8 carbon atoms, 15 to 35 percent by weight of monomers selected from the group consisting of styrene and acrylonitrile and 0.5 to 5 percent by weight of monomers selected from the group consisting of acrylic acid, methacrylic acid, acrylamide, methacrylamide and N-vinyl pyrrolidone in liquid hydrocarbons having a boiling range of 45 to 200° C., said dispersions containing, as protective colloids, 25 to 150 percent by weight based on said dispersed copolymer (A) of a dissolved copolymer (B) having a K value of 20 to 50 and consisting of 80 to 99.5 percent by weight of esters of $C_4$ to $C_{18}$ alkanols with $C_3$ or $C_4$ $\alpha,\beta$-olefinically unsaturated carboxylic acids, and 0.5 to 20 percent by weight of monomers selected from the group consisting of (a) monoesters of $C_3$ to $C_5$ $\alpha,\beta$-olefinically unsaturated monocarboxylic acids with $C_2$ to $C_6$ alkane diols and (b) N-alkoxymethylamides of $C_3$ to $C_5$ $\alpha,\beta$-olefinically unsaturated carboxylic acids, the concentration of copolymers (A) in the dispersion being 30 percent to 55 percent by weight.

7. In a process for the manufacture of pressure-sensitive adhesive coating on flat substrates by coating said substrates with cross-linkable polymers of at least one of acrylic or methacrylic acid esters of lower alkanols with minor amounts of monomers containing cross-linkable groups in solution or dispersion and drying the coated substrates, the improvement comprising using dispersions of copolymers (A) having a K value of 30 to 80 and consisting of 75 to 98.5 percent by weight of esters of $C_1$ to $C_3$ alkanols with $C_3$ or $C_4$ $\alpha,\beta$-olefinically unsaturated monocarboxylic acids, 0.5 to 20 percent by weight of monomers selected from the group consisting of (a) monoesters of $C_3$ to $C_5$ $\alpha,\beta$-olefinically unsaturated monocarboxylic acids with $C_2$ to $C_6$ alkane diols and (b) N-alkoxymethylamides of $C_3$ to $C_5$ $\alpha,\beta$-olefinically unsaturated carboxylic acids in which the alkoxy groups contain 1 to 8 carbon atoms, and 1 to 5 percent by weight of $C_3$ or $C_4$ $\alpha,\beta$-olefinically unsaturated monocarboxylic acids in liquid hydrocarbons having a boiling range of 45 to 200° C., said dispersions containing, as protective colloids, 25 to 150 percent by weight, based on the said dispersed copolymer (A), of a dissolved copolymer (B) having a K value of 20 to 50 and consisting of 80 to 99.5 percent by weight of esters of $C_4$ to $C_{18}$ alkanols with $C_3$ to $C_4$ $\alpha,\beta$-olefinically unsaturated carboxylic acids, and 0.5 to 20 percent by weight of monomers selected from the group comprising (a) monoesters of $C_3$ to $C_5$ $\alpha,\beta$-olefinically unsaturated monocarboxylic acids with $C_2$ to $C_6$ alkane diols and (b) N-alkoxymethylamides of $C_3$ to $C_5$ $\alpha,\beta$-olefinically unsaturated carboxylic acids, the concentration of copolymers (A) in the dispersions being 30 percent to 55 percent by weight.

8. In a process for the manufacture of pressure-sensitive adhesive coating on flat substrates by coating said substrates with cross-linkable polymers of at least one of acrylic or methacrylic acid esters of lower alkanols with minor amounts of monomers containing cross-linkable groups in solution or dispersion and drying the coated substrates, the improvement comprising using dispersions of copolymers (A) having a K value of 30 to 80 and consisting of 40 to 70 percent by weight of esters of $C_1$ to $C_3$ alkanols with $C_3$ or $C_4$ $\alpha,\beta$-olefinically unsaturated monocarboxylic acids, 0.5 to 20 percent by weight of monomers selected from the group consisting of (a) monoesters of $C_3$ to $C_5$ $\alpha,\beta$-olefinically unsaturated monocarboxylic acids with $C_2$ to $C_6$ alkane diols and (b) N-alkoxymethylamides of $C_3$ to $C_5$ $\alpha,\beta$-olefinically unsaturated carboxylic acids in which the alkoxy groups contain 1 to 8 carbon atoms, 15 to 35 percent by weight of monomers selected from the group consisting of styrene and acrylonitrile, and 0.5 to 5 percent by weight of monomers selected from the group consisting of acrylic, methacrylic acid, acrylamide, methacrylamide and N-vinyl pyrrolidone in liquid hydrocarbons having a boiling range of 45 to 200° C., said dispersion containing, as protective colloids, 25 to 150 percent by weight, based on said dispersed copolymer (A), of a dissolved copolymer (B) having a K value of 20 to 50 and consisting of 60 to 90 percent by weight of esters of $C_4$ to $C_8$ alkanols with $C_3$ or $C_4$ $\alpha,\beta$-olefinically unsaturated monocarboxylic acids, and 0.5 to 20 percent by weight of monomers selected from the group consisting of (a) monoesters of $C_3$ to $C_5$ $\alpha,\beta$-olefinically unsaturated monocarboxylic acids with $C_2$ to $C_6$ alkane diols and (b) N-alkoxymethylamides of $C_3$ to $C_5$ $\alpha,\beta$-olefinically unsaturated carboxylic acids, the concentration of copolymers (A) in the dispersions being in the range of 30 to 55 percent by weight.